(12) United States Patent
Emigh

(10) Patent No.: US 8,886,598 B1
(45) Date of Patent: Nov. 11, 2014

(54) TAG-BASED SYNCHRONIZATION

(76) Inventor: Aaron T. Emigh, Incline Village, NV (US)

( * ) Notice: Subject to any disclaimer, the term of this patent is extended or adjusted under 35 U.S.C. 154(b) by 731 days.

(21) Appl. No.: 11/895,163

(22) Filed: Aug. 22, 2007

Related U.S. Application Data

(60) Provisional application No. 60/839,216, filed on Aug. 22, 2006.

(51) Int. Cl.
*G06F 17/00* (2006.01)

(52) U.S. Cl.
USPC ............................ 707/620; 707/805; 709/248

(58) Field of Classification Search
USPC ......... 707/617, 609–614, 618, 620, 624, 694, 707/705, 758, 804, 805, 821, 822, 825, 707/826; 709/248
See application file for complete search history.

(56) References Cited

U.S. PATENT DOCUMENTS

| | | | |
|---|---|---|---|
| 7,756,945 B1 * | 7/2010 | Andreessen et al. | 709/217 |
| 8,392,543 B1 * | 3/2013 | Singh et al. | 709/221 |
| 2007/0014314 A1 * | 1/2007 | O'Neil | 370/503 |
| 2007/0271317 A1 * | 11/2007 | Carmel | 707/204 |

OTHER PUBLICATIONS

Jongho Nang et al., A New Multimedia Synchronization Specification Method for Temporal and Spatial Events, 1997, IEEE, 236-243.*

* cited by examiner

*Primary Examiner* — Jean B Fleurantin

(57) ABSTRACT

In some embodiments, techniques for synchronization may include determining a tag associated with a synchronization specification, determining a content element associated with the tag; and synchronizing the content element.

15 Claims, 5 Drawing Sheets

TAG-BASED SYNCHRONIZATION

CROSS REFERENCE TO RELATED APPLICATIONS

This application claims priority to U.S. Provisional Patent Application No. 60/839,216, entitled INFORMATION PROCESSING, filed Aug. 22, 2006, which is incorporated herein by reference for all purposes.

FIELD OF THE INVENTION

The present invention relates generally to the area of data synchronization. More specifically, techniques for synchronizing data based on tags are disclosed.

BACKGROUND OF THE INVENTION

Portable electronic devices of various types have proliferated, aided by the wide availability and increasingly low cost of high-density memories and processing power. Personal digital assistants and hybrid devices such as cellular telephones are commonly used to store contact information such as names, email addresses, phone numbers and street addresses, which are also often kept on general-purpose computing devices. Many different types of devices, such as dedicated media players, cell phones, and general-purpose computing devices, are bring used to organize and play media content such as music and videos. This proliferation of devices storing the same type of data has led to widespread use of data synchronization between devices to maintain consistency, or to update one device's data from another's.

User-created tags are an increasingly popular way to organize assets such as email, web pages and photos. Tagging allows users to organize their content in ways that make sense to the user, without requiring a fixed structure or taxonomy.

Current technologies provide for synchronization on the basis of freshness of content, genre, and random selection. However, they do not provide for using tags to synchronize content. This restricts users from being able to use convenient, personalized and unstructured metadata when synchronizing, resulting in difficulty and wasted time due to the lack of control and necessity to either select content elements for synchronization manually or conform to structured data that may not reflect their preferred organization.

Accordingly, it would be useful to be able to use user-generated tags in synchronization of content elements.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
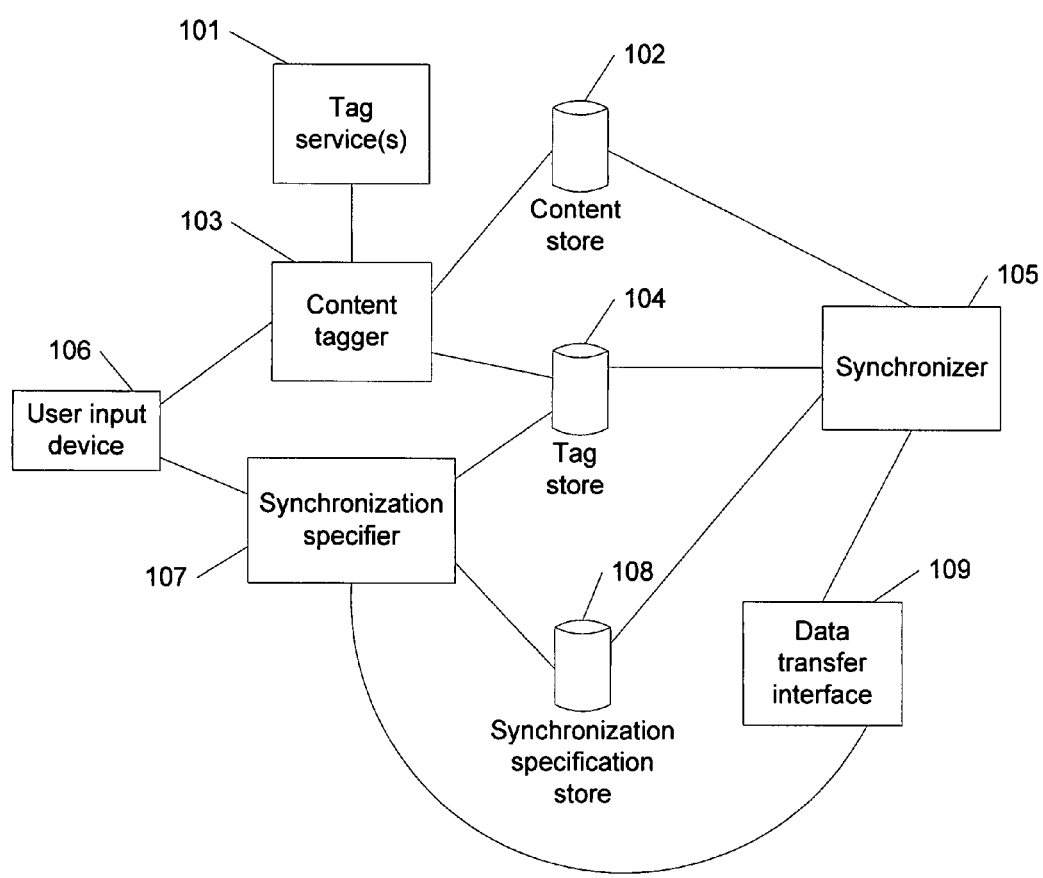
FIG. 1 is a diagram of a system for synchronizing content using tags, according to some embodiments.

FIG. 1 is a diagram of a system for synchronizing content using tags, according to some embodiments. Content refers herein to one or more distinct digital data elements. An example of content is a contact, which may include such contact-related data as a name, company affiliation, email address, phone number, instant messaging address, physical address, etc., including in some embodiments multiple sets of such information, which may be categorized as work, home, etc. Another example of content is media content such as a song, digital book, voice recording or video. In some embodiments, content may be grouped or ordered, for example by a playlist which groups together one or more content elements and in some embodiments specifies an ordering of such elements. In some embodiments, a content element may be associated with a creation and/or modification time.

Synchronization refers herein to transmitting data from one content repository to another, wherein content elements to be transmitted can be selected automatically according to one or more criteria. In some embodiments, synchronization may be performed between two separate devices, such as a personal computer and a portable device such as a cell phone, personal digital assistant (PDA), or media player, or between two personal computers, or between two portable devices. An example of synchronization is to transmit all relevant content (such as all contacts, or all media, or all media of a particular type, such as audio media) that is newer on device A than device B, or is present on device A and not on device B, from device A to device B. Another example of synchronization is to perform such transfer only for specified media elements, such as all media elements belonging to a specified playlist, or associated with a particular artist or genre. Another example of synchronization is to perform a synchronization process, for example as discussed above, bidirectionally.

In the example of this FIG. 1, one or more tag sources 101 and/or a user input device 106 may provide one or more tags to a content tagger 103. An example of a tag source 101 is a network-accessible service that provides user-created tags via a network interface, for example from a social tagging service in which user tags for content elements such as media elements can be shared among users of the service. Another example of a tag service 101 is a synchronization service which acquires tags associated with content elements. Examples of a user input device 106 include a keyboard, a mouse, a touchpad, a touch-sensitive screen, and a microphone associated with voice recognition software.

A tag refers herein to a string of characters, such as an alphanumeric string, which has been or can be associated by a user with a user-visible element such as a synchronization specification or content element. An example of a tag is a string entered (e.g. typed in) by an user and associated with an element. Another example of a tag is a string selected by an end-user to associate with an element, for example from a suggestion interface such as a tag cloud or completion list. Another example of a tag is a selection by a user of a term extracted from content (for example using a term extraction algorithm known to those skilled in the art, such as TFIDF) and associated with the content. In some embodiments, a tag may have been originated at some point in its history by a user. An example of a tag originating at some point in history by a user is immediate origination, such as receiving a tag entry or selection. Another example of a tag originating at some point in history by a user is receiving a tag from a social tagging service that had previously been originated by a user. In some embodiments, a tag association may be specific to one user. In some embodiments, a tag association may be shared between users, e.g. in a folksonomy. Examples of tagging and folksonomies are discussed in Ellyssa Kroski, "The Hive Mind: Folksonomies and User-Based Tagging," available via the internet at http://infotangle.blogsome.com/2005/12/07/the-hive-mind-folksonomies-and-user-based-tagging/.

Content tagger 103 associates zero or more tags with one or more content elements stored in a content store 102. Examples of a content store 102 include one or more files on a filesystem, and a database such as a relational database, and a combination of a filesystem and a relational database, for example in which data in a relational database maps content element identifiers to content elements stored in a filesystem. In some embodiments, a content store 102 may be or include an in-memory data structure such as an array, list, binary tree, or hash table. In some embodiments, a such an in-memory data structure may be read from and written to persistent storage such as a database or file.

Tags and mappings between tags and content elements are stored in a tag store 104. Examples of a tag store 104 include one or more files on a filesystem, and a relational database, for example including a table mapping tags to identifiers and a table mapping tag identifiers to content element identifiers. In some embodiments, a tag store 104 may be or include an in-memory data structure such as an array, list, binary tree, or hash table. In some embodiments, a such an in-memory data structure may be read from and written to persistent storage such as a database or file.

A synchronization specifier 107 receives input from user interface device 106 and/or data transfer interface 109, and constructs and/or edits one or more synchronization specifications stored in synchronization specification store 108 using tag store 104. A synchronization specification refers herein to a specification of what content elements are to be synchronized. In some embodiments, a synchronization specification may include one or more references to specific content elements. In some embodiments, a synchronization specification may include specifications of one or more criteria for synchronizing content element(s), such as relative newness of a content element, a tag associated with content element(s), a genre or classification associated with content element(s), etc. Examples of a synchronization specification store 108 include one or more files on a filesystem, and a relational database, for example in which synchronization specification names and/or identifiers are mapped to one or more content elements and/or tags. In some embodiments, a synchronization specification store 108 may be or include an in-memory data structure such as an array, list, binary tree, or hash table. In some embodiments, such an in-memory data structure may be read from and written to persistent storage such as a database or file.

In various embodiments, content store 102, tag store 104 and/or synchronization specification store 108 may be associated with different physical or logical databases, or one or more of them may be associated with the same physical or logical database, for example as separate tables within a database. In various embodiments, content store 102, tag store 104 and/or synchronization specification store 108 may be associated with persistent storage such as magnetic storage or flash memory, and/or ephemeral storage such as DRAM.

A synchronizer 105 may select content elements to be synchronized. Such elements to be synchronized may be computed based on content elements associated with a content store 102, content elements associated with a remote device, an enumeration of which may be received via data transfer interface 109, a synchronization specification associated with synchronization specification store 108, and one or more tags associated with a tag store 104. For example, elements to be synchronized may include elements that differ between elements stored locally and in a remote device, in a manner specified by a synchronization specification, which may specify elements associated with one or more tags in addition to other optional specification(s).

In addition to selecting content elements to be synchronized, synchronizer 105 may receive data via data transfer interface 109 corresponding to one or more content elements and associated metadata (such as name, address, artist, one or more tags, etc.), which may be associated with content store 102. One or more tags associated with such content element(s) may be stored in tag store 104. Additionally, synchronizer 105 may transmit data via data transfer interface 109 corresponding to one or more content elements and/or associated metadata (such as name, address, artist, one or more tags, etc.), which may be retrieved from content store 102, tag store 104, and/or other data sources not shown in this FIG. 1. In some embodiments, synchronization specifier 107 may receive a synchronization specification via data transfer interface 109.

Data transfer interface 109 may provide a connection to a corresponding data transfer interface on another device (not shown). Data transfer interface 109 may transmit data from synchronizer 105 to another device, and/or receive data from another device and provide it to synchronizer 105 and/or synchronization specifier 107.

In some embodiments, a connection between data transfer interface 109 and an external device may be point-to-point, for example via a USB connection, serial connection, Firewire connection, Bluetooth, or other point-to-point mechanical and/or wireless interface. In some embodiments, such a connection may be made via a network, for example a public network such as the internet, a cellular phone network such as a GPRS network. In some embodiments, a network may be a wireless network such as an 802.11 or GPRS network. In some embodiments, a network may include more than one network. An example of a network including more than one network is a local area network or point-to-point connection connected in turn to a public network such as the internet.

In various embodiments, the system of this FIG. 1 may be associated with a computer or with a portable media device such as an MP3 player, video player, iPod, PDA, or cellular phone.

Additional details of the operation of the system of this FIG. 1 are discussed in conjunction with the remaining Figures.

Figure 2:
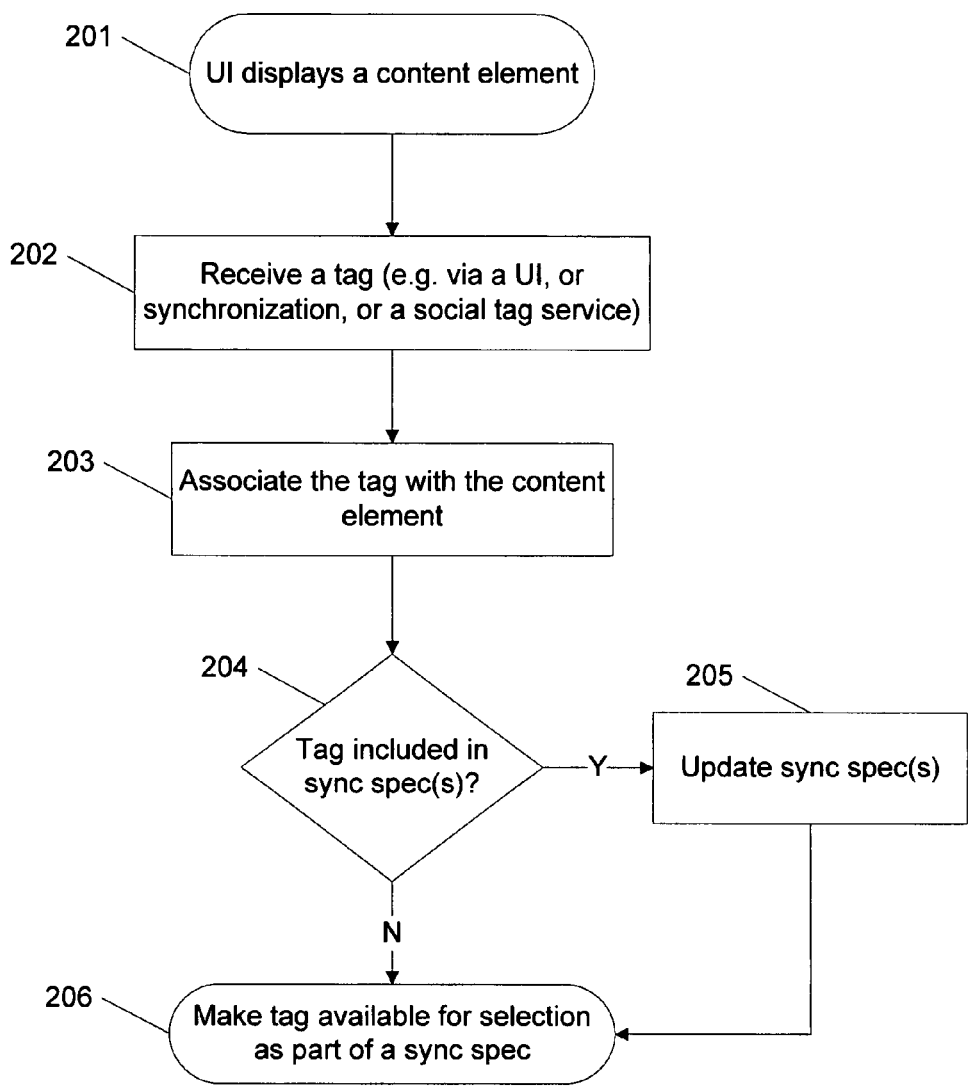
FIG. 2 is a flow diagram of a method for processing a tag entry, according to some embodiments.

FIG. 2 is a flow diagram of a method for processing a tag entry, according to some embodiments. In this example, a content element is displayed (201). An example of displaying a content element is to display information relating to the content element, such as the content element itself or associated metadata such as a name, title, artist, comment, etc. on a user interface such as a screen. Another example of displaying a content element is to transmit information related to the content element, such as transmitting HTML at a web server. In various embodiments, a content element may be displayed in conjunction with a view of content elements such as a playlist view, a view of a library of content elements, a view of a single content element, and/or a view specific to tag entry.

A tag may be received (202). One example of receiving a tag is to receive it via a user interface element enabling a user to type in a tag name, such as a textbox. Another example of receiving a tag is to receive it via a user interface element enabling a user to select a tag name, such as a combo box or an autocomplete facility associated with a user interface element such as a textbox, which may for example present available, previously used and/or popular tags for selection. Another example of receiving a tag is to receive it as audio input and apply voice recognition. Another example of receiving a tag is to receive it as metadata associated with a song being synchronized with another device such as a computer, PDA, phone or media player, or as a primary element being synchronized with such a device. Another example of receiving a tag is to receive it from a tag source such as tag source 101 of FIG. 1. Receiving a tag may be associated with a directive to associate the tag with the content element, either explicitly (e.g. via a user interface that explicitly or implicitly states such an association) or implicitly, e.g. by receiving a tag from a tag source.

The tag may be associated with the content element (203), for example by associating an identifier associated with the tag with an identifier associated with the content element in a tag store such as tag store 104 of FIG. 1.

It may be determined whether the tag is included in one or more synchronization specifications (204). If it is determined that the tag is associated with a synchronization specification (204), then in this example the synchronization specification is updated (205) for each such synchronization specification. An example of updating the synchronization specification is to add the content element to the synchronization specification. In some embodiments, for example in which a tag and not individual content elements relating to the tag is associated with the synchronization specification, such an update may be performed implicitly, i.e. an update of affected content elements may not be explicitly performed.

If it is determined that the tag is not included in a synchronization specification (204), or after updating one or more synchronization specifications (205), then in this example the tag is made available for selection as part of a synchronization specification (206) if it is not already (for example if this is the first use of the tag). An example of selecting a tag as part of a synchronization specification is discussed in conjunction with FIG. 3.

Figure 3:
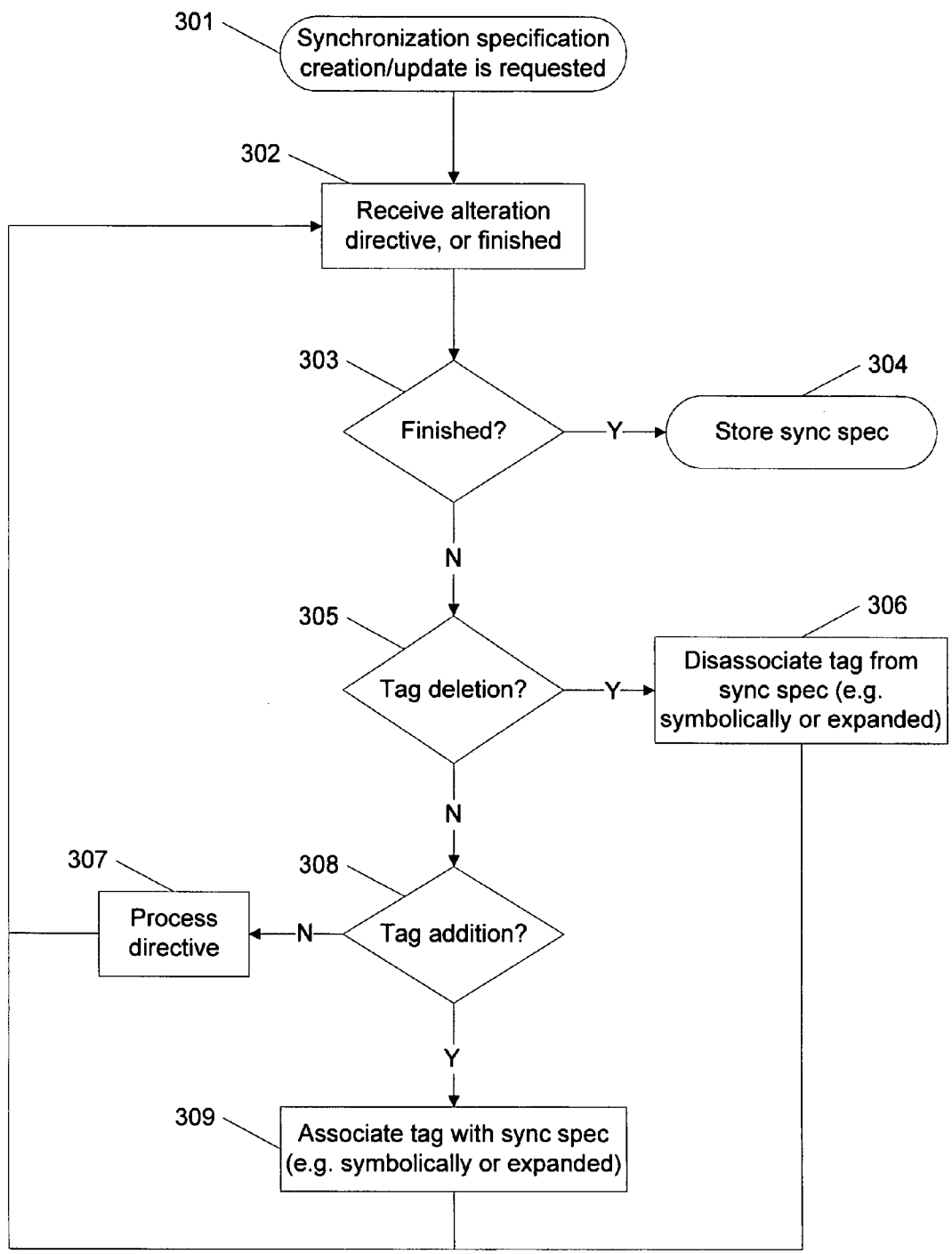
FIG. 3 is a flow diagram of a method for creating or updating a synchronization specification incorporating a tag, according to some embodiments.

FIG. 3 is a flow diagram of a method for creating or updating a synchronization specification incorporating a tag, according to some embodiments. In this example, synchronization specification creation or editing is requested (301). An example of receiving a request for synchronization specification editing or creation is to receive a request to create or alter a synchronization specification via a user interface or an HTTP request. In some embodiments, a synchronization specification may be displayed in response to such a request.

An directive to alter the synchronization specification, or an indication that creation or alteration is finished, may be received (302).

It may be determined whether editing is finished (303). If it is determined that editing is finished (303), then in this example the synchronization specification is stored (304). An example of storing the synchronization specification is to store it in a synchronization specification store such as synchronization specification store 108 of FIG. 1. In some embodiments, the synchronization specification may be named prior to storing it. In some embodiments, the name of a remote device associated with the synchronization specification may be used as the name of the synchronization specification. In some embodiments, for example when a synchronization specification consists of a single tag, the name of the tag may be used as the name of the synchronization specification. In some embodiments, a separate input may be used as the name of the playlist, for example via a user interface element such as a textbox. In some embodiments, only modifications to the synchronization specification may be stored.

If it is determined that editing is not finished (303), then in this example it may be determined whether the directive is associated with a tag deletion (305). If so (305), then in this example a specified tag is disassociated from the synchronization specification (306). One example of disassociating a tag from the synchronization specification is to symbolically remove the tag from the synchronization specification, e.g. to remove an identifier associated with the tag from a data structure such as a database table or an in-memory data structure (such as an array or a hash table) associated with the synchronization specification. Another example of disassociating a tag from the synchronization specification is to do so in an expanded mode, e.g. to determine the set of content elements associated with the tag and remove them from the synchronization specification. In some embodiments, such expanded content elements associated with the tag to be removed may be kept on the synchronization specification if they are separately associated with the synchronization specification due to their belonging in the synchronization specification for a separate reason, such as also having been tagged with a different tag associated with the synchronization specification, or having been otherwise added to the synchronization specification. Another directive to alter the synchronization specification, or an indication that alterations are finished, may be received (302).

If it is determined that the directive is not associated with a tag deletion (305), then in this example it may be determined whether the directive is associated with a tag addition (308). If not, then in this example the directive is processed (307). One example of processing the directive is to add an individual content element to the synchronization specification. Another example of processing the directive is to remove an individual content element from the synchronization specification. Another example of processing the directive is to rename the synchronization specification. Another example of processing the directive is to add or remove one or more content elements associated with an artist, album, company, name, or genre. Another directive to alter the synchronization specification, or an indication that alterations are finished, may be received (302).

If it is determined that the directive is associated with a tag addition (308), then in this example the tag is associated with the synchronization specification (309). One example of associating a tag with a synchronization specification is to symbolically associate the tag with the synchronization specification, e.g. to add an identifier associated with the tag to a data structure such as a database table or an in-memory data structure associated with the synchronization specification. Another example of associating a tag with the synchronization specification is to do so in an expanded mode, e.g. to determine a set of one or more content elements associated with the tag and add them to the synchronization specification. In some embodiments, such an addition may only add content elements that are not already associated with the synchronization specification. Another directive to alter the synchronization specification, or an indication that alterations are finished, may be received (302).

Figure 4:
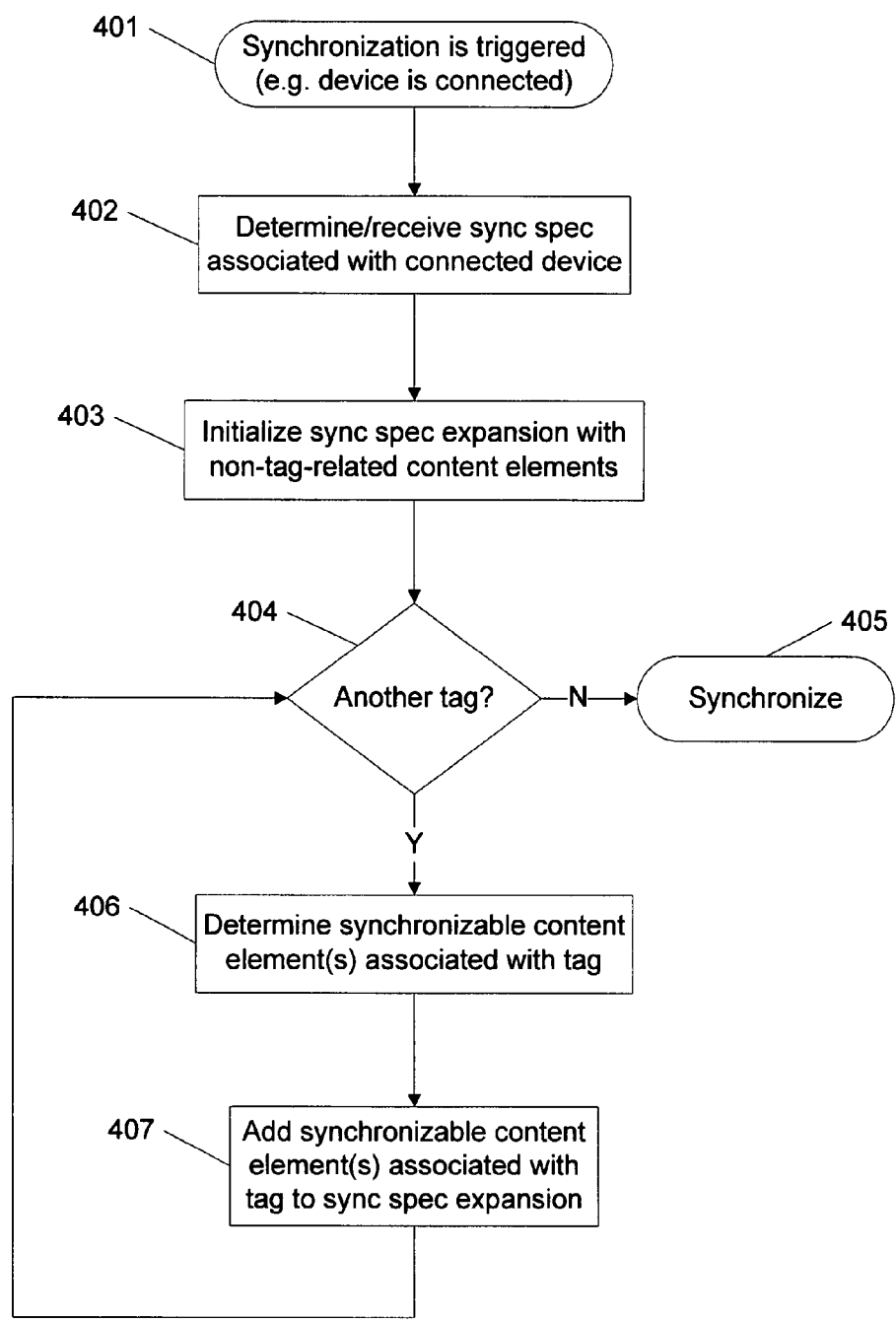
FIG. 4 is a flow diagram of a method for synchronizing content based in whole or in part on one or more tags, according to some embodiments.

FIG. 4 is a flow diagram of a method for synchronizing content based in whole or in part on one or more tags, according to some embodiments. In this example, synchronization is triggered (401). One example of triggering synchronization is to receive an explicit instruction, for example via a user interface, to synchronize. Another example of triggering synchronization is to detect that a connection has been established or is available with a device with which synchronization is to be performed (for example a device with which synchronization is configured to be performed). Another example of triggering synchronization is to receive a request for synchronization from a device. Another example of triggering synchronization is to trigger a rule such as an elapsed period of time since a last synchronization. Another example of triggering synchronization is a combination of two or more of the foregoing examples, such as determining that a device is connected and a predetermined or configured period of time has elapsed since the last synchronization with the device.

A synchronization specification associated with a connected device may be determined and/or received (402). An example of a connected device is a device connected via data transfer interface 109 of FIG. 1. An example of determining a synchronization specification associated with a connected device is to look up a synchronization specification matching the device, for example by looking up a synchronization specification in a database table using an identifier associated with the connected device as a key. An example of receiving a synchronization specification is to receive it via data transfer interface 109 of FIG. 1, for example from a remote device being synchronized with. In some embodiments, a determined synchronization specification may be combined with a received synchronization specification, for example by taking the union of the two, or the more recent, or by replaying events such as additions and deletions starting from a common time, in temporal order, from either or both synchronization specifications, and using the resulting synchronization specification.

A synchronization specification expansion may be initialized with zero or more content elements associated with the synchronization specification that are not tag-related (403). A synchronization specification expansion refers herein to a data structure such as a list containing an enumeration of content elements associated with a synchronization specification. Examples of content elements associated with the synchronization specification that are not tag-related include content elements that have been individually added to a synchronization specification, and/or that have been added as a group not related to tags, such as content elements associated with a category of contact (such as business or personal contacts), user, title, artist, album, or genre.

It may be determined whether there is another tag associated with the synchronization specification that has not yet been expanded (404). If not, then in this example synchronization is performed (405). In some embodiments, synchronization may be unidirectional, i.e. only transmitting or only receiving content item(s). In some embodiments, synchronization may be unidirectional, i.e. involving both transmitting and receiving content item(s).

In some embodiments, synchronizing may include transmitting a synchronization specification associated with a connected device, for example via data transfer interface 109 of FIG. 1, and/or transmitting a synchronization specification expansion. In some embodiments, synchronizing may include receiving a remote expansion, which may in some embodiments be of similar format as the synchronization specification expansion discussed above. In some embodiments, expansion data sent and/or received may be limited to data that has changed since a last synchronization.

Synchronizing may include determining content elements from among the synchronization specification expansion and/or the remote expansion which are to be synchronized. In some embodiments, the synchronization specification expansion may comprise the content element(s) which are to be synchronized. In some embodiments, content element(s) to be synchronized may be determined based on a comparison between elements on the synchronization specification expansion and a remote expansion.

As an example of such a comparison, incoming and outgoing synchronization lists (ISL and OSL respectively) may be initialized to empty lists. A synchronization specification expansion (SSE) and remote expansion (RE) may be compared element-wise. Any content element that appears in the SSE but not in the RE is added to the OSL. Any content element that appears in the RE but not in the SSE is added to the ISL. Any content element that appears in both the SSE and the RE is compared in terms of modification time and optionally a checksum such as a CRC or hash. If the modification time is later in the SSE than the RE and the checksum, if present, is different, then the content element is added to the OSL. If the modification time is later in the RE than the SSE and the checksum, if present, is different, then the content element is added to the ISL. Deletions may be handled analogously, for example by using records of such deletions in place of content elements and deleting a content element when such a deletion record is received during synchronization.

Zero or more content elements corresponding to elements on the synchronization specification expansion, and optionally metadata such as name, associated tag(s), modification time, etc. may be transmitted, for example elements on an outgoing synchronization list as discussed above. Zero or more content elements corresponding to elements in a remote expansion, and optionally metadata such as name, associated tag(s), modification time, etc. may be received, for example elements on an incoming synchronization list as discussed above. Elements that are received may be stored, for example in a content store such as content store 102 of FIG. 1. Associated metadata may be stored, for example in content store 102 of FIG. 1 and/or tag store 104 of FIG. 1.

Synchronization operations are known to those skilled in the art, and the description discussed in conjunction with this 405 is illustrative. In some embodiments, another synchronization scheme may be employed.

If it is determined that there is another tag associated with the playlist that has not yet been expanded (404), then in this example zero or more synchronizable content elements associated with the tag are determined (406). As an example of determining content element(s) associated with a tag, the tag or an identifier associated therewith may be used as a key in a data structure such as a hash table, array or database table, and zero or more identifiers relating to associated content elements may be retrieved. In some embodiments, all relevant content elements may be considered synchronizable. In some embodiments, content elements meeting an additional criterion may be considered synchronizable. An example of such a criterion is a creation or modification time associated with the item that is after a reference time such as the last synchronization with the remote device being synchronized with, or after a time associated with an equivalent content element associated with the remote device being synchronized with.

The synchronizable content element or elements, if any, associated with the tag may be added to the synchronization specification expansion (407). An example of adding the elements to the synchronization specification expansion is to append the elements to the end of the synchronization specification expansion. Adding to the synchronization specification expansion may be idempotent, avoiding duplicates. For example, if a content element associated with the tag is already associated with the synchronization specification expansion, it may not be added an additional time. It may be determined whether there is another tag associated with the synchronization specification that has not yet been expanded (404).

Figure 5:
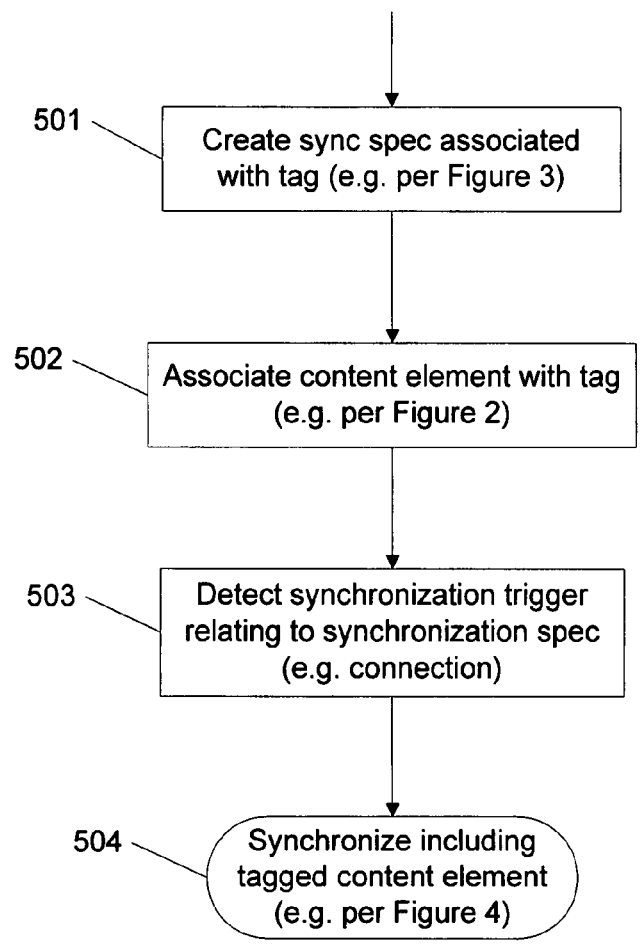
FIG. 5 is a flow diagram of a method for synchronizing content using tags, according to some embodiments.

FIG. 5 is a flow diagram of a method for synchronizing content using tags, according to some embodiments. In this example, a synchronization specification including a tag may be created (501), for example as discussed in conjunction with FIG. 3.

The tag may be associated with a content element (502), for example as discussed in conjunction with FIG. 2.

A synchronization trigger relating to the synchronization specification may be detected (503), for example as discussed in conjunction with 401 of FIG. 4.

Content including the tagged content element may be synchronized (504), for example as discussed in conjunction with FIG. 4.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for synchronization, comprising:
   receiving a tag via a user interface element;
   associating the tag with a content element;
   associating the tag with a synchronization specification;
   determining that a synchronization has been triggered, wherein determining that the synchronization has been triggered includes detecting a connection to a device;
   determining that the synchronization specification is associated with the synchronization;
   determining that the tag is associated with the synchronization specification;
   determining that the content element is associated with the tag; and
   synchronizing the content element, wherein synchronizing the content element includes at least one of transmitting the content element and receiving the content element.

2. The method of claim 1, wherein the synchronization specification is associated with the device.

3. The method of claim 1, further comprising determining a modification time associated with the content element, and comparing the modification time to a second modification time.

4. The method of claim 1, wherein the content element is associated with digital media.

5. The method of claim 1, wherein the content element is associated with a contact.

6. A system for synchronizing, comprising:
   a processor configured to:
      receive a tag via a user interface element;
      associate the tag with a content element;
      associate the tag with a synchronization specification;
      determine that a synchronization has been triggered, wherein determining that the synchronization has been triggered includes detecting a connection to a device;
      determine that the synchronization specification is associated with the synchronization;
      determine that the tag is associated with the synchronization specification;
      determine that the content element is associated with the tag; and
      synchronize the content element, wherein synchronizing the content element includes at least one of transmitting the content element and receiving the content element; and
   a memory coupled with the processor, wherein the memory provides instructions to the processor.

7. The system of claim 6, wherein the content element is associated with digital media.

8. The system of claim 6, wherein the processor is further configured to determine a modification time associated with the content element, and compare the modification time to a second modification time.

9. The system of claim 6, wherein the synchronization specification is associated with the device.

10. The system of claim 6, wherein the content element is associated with a contact.

11. A computer program product for synchronizing, the computer program product being embodied in a non-transitory computer readable medium and comprising computer instructions for:
    receiving a tag via a user interface element;
    associating the tag with a content element;
    associating the tag with a synchronization specification;
    determining that a synchronization has been triggered, wherein determining that the synchronization has been triggered includes detecting a connection to a device;
    determining that the synchronization specification is associated with the synchronization;
    determining that the tag is associated with the synchronization specification;
    determining that the content element is associated with the tag; and
    synchronizing the content element, wherein synchronizing the content element includes at least one of transmitting the content element and receiving the content element.

12. The computer program product of claim 11, wherein the content element is associated with a contact.

13. The computer program product of claim 11, further comprising computer instructions for determining a modification time associated with the content element, and comparing the modification time to a second modification time.

14. The computer program product of claim 11, wherein the synchronization specification is associated with the device.

15. The computer program product of claim 11, wherein the content element is associated with digital media.

* * * * *